United States Patent [19]

Eriksson

[11] Patent Number: 5,143,001
[45] Date of Patent: Sep. 1, 1992

[54] PROCESS AND A DEVICE FOR TRANSFERRING LEACHABLE SUBSTANCE IN WASTE MATERIAL INTO GAS OR LEACH STABLE COMPOUNDS

[75] Inventor: Sven Eriksson, Falun, Sweden

[73] Assignee: SKF Plasma Technologies, Hofors, Sweden

[21] Appl. No.: 814,228

[22] Filed: Dec. 23, 1991

Related U.S. Application Data

[63] Continuation of Ser. No. 469,637, Jan. 24, 1990, abandoned.

[30] Foreign Application Priority Data

Jan. 25, 1989 [SE] Sweden ................... 8900254

[51] Int. Cl.⁵ ............................. F23J 7/00
[52] U.S. Cl. ..................... 110/345; 110/264; 110/244; 110/347
[58] Field of Search ............. 110/345, 347, 264, 244

[56] References Cited

U.S. PATENT DOCUMENTS

| | | | |
|---|---|---|---|
| 4,132,180 | 1/1979 | Fredrick | 110/244 |
| 4,800,825 | 1/1989 | Kuenzly | 110/264 |
| 4,873,930 | 10/1989 | Egense et al. | 110/264 |
| 4,920,898 | 5/1990 | Solbes et al. | 110/214 |

*Primary Examiner*—Henry C. Yuen

*Attorney, Agent, or Firm*—Armstrong, Nikaido, Marmelstein, Kubovcik & Murray

[57] ABSTRACT

A process for transferring environmentally harmful substances which are easily leachable from openly discarded waste material, and which to a large proportion consists of inorganic material, such as spent spot linings for aluminum electrolysis cells, into gaseous form or into leach stable compounds, includes the steps of heating that the material in finely ground form is heated and in that reagents such as silica, water and oxygen are added in a cyclone furnace (1) which includes a heat source (2) for example a plasma generator, and a cylindrical furnace vessel (10). By feeding the waste material and the reagents via a mixing and prereaction chamber (3) which is located between the high temperature source and the vessel (10), a very high proportion of the added materials are reacted in the furnace. A device for carrying the process into effect includes a cyclone furnace (1) having a high plasma generated (2) tangentially connected to the horizontally arranged cylindrical vessel (1), at one end portion thereof, via a mixing and prereaction chamber (3) into which the waste material and the reagents are injected and super heated before they flow into the furnace vessel (10). At the other end portion of the vessel (10) there is an upper outlet for drawing off formed gaseous material, and a lower outlet (4) for drawing off formed solid and/or liquid material.

7 Claims, 1 Drawing Sheet

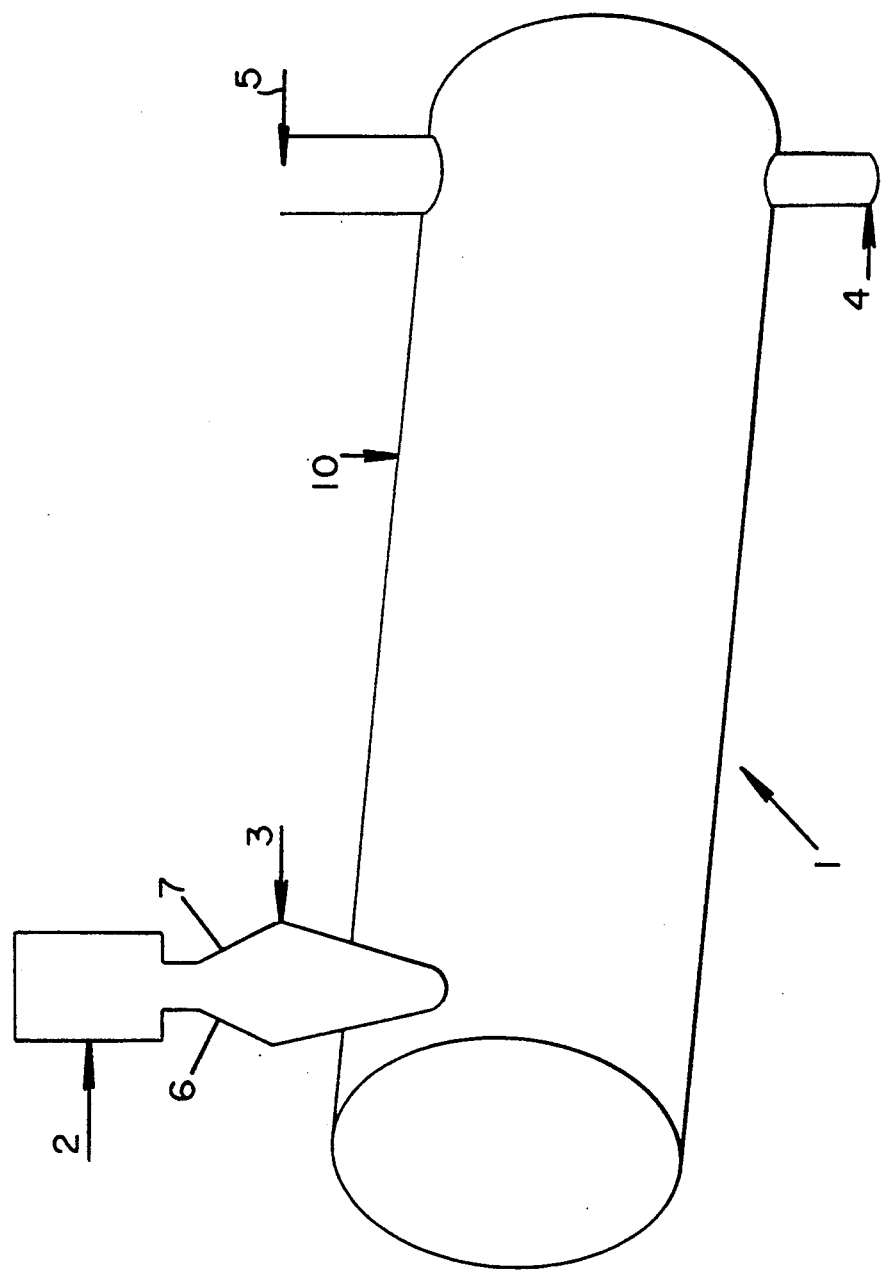

PROCESS AND A DEVICE FOR TRANSFERRING LEACHABLE SUBSTANCE IN WASTE MATERIAL INTO GAS OR LEACH STABLE COMPOUNDS

This application is a continuation of application Ser. No. 07/469,637 filed Jan. 24, 1990, now abandoned.

The present invention refers to a process of transferring environmentally harmful substances such as cyanides, fluorides or the like, which are leachable from discarded waste material, such as spent pot linings for aluminum electrolysis cells, into gas or into leach stable compounds, wherein the waste material in finely distributed form is heated and reagents such as silica, water and oxygen are added.

The invention also refers to a device for carrying the process into effect.

At many industrial processes, a waste is obtained as a by-product, this waste comprises a large amount of inorganic material which due to its content of hazardous substances in easily leachable form, cannot be discarded in an environmentally safe way. Because the industrial waste due to its high content of inorganic material, has a low calorific value, it can be combusted only by large addition of noble energy.

At production of for example aluminum from aluminum oxide, aluminum oxides are dissolved in a cryolite melt at about 1000° C., wherein the oxide is continuously electrolyzed. The electrolysis cell must frequently be renovated and the pot lining thereof be replaced. This lining or liner is then so highly impregnated by the sodium and fluorine content of the cryolite, and also of cyanide formed during the process, that the liner cannot be openly discarded in a way which is environmentally acceptable.

In FR 87 08 012, a process is revealed, according to which such a lining is melted together with silica and with addition of water and air, and also heat is added. The gaseous material then leaving, can be taken care of in conventional ways, and the solid compounds which are formed, are leach stable.

In an attempt to carry out the method indicated in FR 87 08 012, that is to treat material of the indicated type, namely spent linings from aluminum electrolysis cells, while using a cyclone furnace which is provided with a plasma generator, the process could however not be carried out to the intended result. The cyclone furnace was fed in the usual way, namely by axial feed of the waste material through one end of the furnace, the treated material being fed out at the other end of the cyclone furnace. It turned out that a large proportion of the material passed the cyclone furnace without having been reacted.

An object of the invention is therefore to provide a process and a device which permit carrying out the technique of transferring the leachable substances into gas or into leach stable compounds in a cyclone furnace, with high ratio of reaction for the added waste material.

The invented process and the invented apparatus are defined in the appended independent claims. Embodiments of the invention are stated in the appended subclaims.

It has thus turned out that surprisingly, the object is attained if at least the waste material and possibly also the added reagents are fed into a mixing and prereaction chamber which is located between the high temperature source of the furnace and the furnace vessel, and which is tangentially connected to the furnace vessel.

A conceivable cause for the observed phenomenon, (namely that direct axial material feed of a cyclone furnace to which a high temperature source is tangentially connected, leads to the effect that a large amount of added material passes the furnace without having reacted,) could be that the reaction tendency of the material at issue is so low that the material cannot start to react, in spite of the fact that the ambient temperature is the final temperature of the system. In order that a reaction shall occur, apparently the waste material, or at least the material surfaces must be super heated, and this can occur in the very hot gas which leaves the high temperature source, that preferably is a plasma generator.

Thus, one could say that the materials at issue has so low reactivity that the reactions toward the thermodynamic equilibrium condition have difficulties to start, and this means that it is not certain that the intended reactions occur, in spite of the suggestion according to the prior art, of addition of high quality fuel.

In the following, the invention will be described in the form of an example with reference to the appended drawing which schematically shows an apparatus according to the invention.

On the drawing there is shown a generally horizontally oriented cyclone furnace 1 comprising a high temperature source 2, for example in the form of a plasma generator, which is tangentially connected to the furnace vessel at one end portion thereof. Between the high temperature source 2 and the furnace 1 there is a prereaction chamber 3 wherein the waste material to be treated is injected in finely ground form and is super heated. The material can be spent pot linings from aluminum electrolysis cells or the like. In the drawing the waste injection is schematically shown at 6. Also reagent materials are injected into the chamber 3 at 7. The reagent materials consist for example of finely distributed silica, water and oxygen when the waste material consists of the above mentioned liner. The waste material and the reagents are thus super heated and thoroughly mixed in the mixing and prereaction chamber 3, and are transferred into the furnace vessel 10 were the final reactions occur. Formed solid and/or liquid materials are separated from the formed gaseous phase, and are drawn off at the slag outlet 4. The produced hot gas is drawn off from the furnace vessel at the gas outlet 5 for transfer to suitable gas treatment apparatus.

The slag could suitably be caused to form or be brought to form a glass like material from which possible remaining hazardous substances in practice are not leachable so that the glasslike material can be discarded without environmental hazards.

As to suitable ratios between waste material and reagents, and other details of the mentioned process, reference is had to FR 87 08 012, and the portions of FR 87 08 012 which are relevant to the present invention, are hereby incorporated herein.

The vessel 10 is preferably cylindrical.

For economical reasons, the system is preferably designed to maintain a temperature which barely supports the intended reactions, and an important feature of the invention is that the surfaces of the material are super heated in the preheating chamber 3 in such an extent that the intended reactions start early and continue in spite of a minimal system temperature in the vessel 10.

In the following the invention is further illustrated by by examples 1-3.

Example 1 reveals operation of the process at a furnace of cyclone type with axial feeding of the feed material.

Example 2 reveals operation of the process at a furnace of cyclone type and with material feed via a pre-reactor/mixing chamber as per the present invention.

Example 3 reveals the operability of the invention technique for varying composition of the feed.

EXAMPLE 1

| I - Composition of feed | |
|---|---|
| Impregnated bricks = | 53.2% |
| Impregnated blocks = | 33.5% |
| Silica ($SiO_2$ sand) = | 13.3% |
| II - Operating parameters | |
| Feed rate = | 207 kg/h |
| Water injection = | 12 l/h |
| Air injection = | 426 $Nm^3$/h |
| Net plasma power = | 645 kW |
| Reactor thermal losses = | 573 kW |
| Net power for process = | 72 kW |
| III - Results | |
| Fumes temperature = | 1270°C. |
| Dust in fumes = | 11.0 g/$Nm^3$ |
| Composition of dust = | F = 48.3% Na = 23.4% Al = 7.4% |
| | Si = 3.4% |
| Composition of slag = | F = 3.5% Na = 9.7% Ca = 2.0% |
| | K = 0.7% Al = 9.1% Si = 25.0% |
| | C = 4.85% |
| IV - Leachability of slag | |
| $CN^-$ not detected | |
| Soluble $F^-$ = 0.39% | |

EXAMPLE 2

| I - Composition of feed (by weight) | |
|---|---|
| Impregnated bricks (grinded to <2 mm) = | 45% |
| Impregnated carbon blocks (grinded to <2 mm) = | 28.5% |
| Clay (73% $SiO_2$ + 27% $Al_2O_3$) = | 26.5% |

| Composition of impregnated bricks and blocks (% by weight) | | | | | | |
|---|---|---|---|---|---|---|
| | C | F | Al | Si | Na | Ca | $CN^-$ |
| Impregnated bricks | 4.7 | 5.6 | 10.9 | 23.3 | 7.8 | 2.9 | 0.05 |
| Impregnated carbon blocks | 51.3 | 11.6 | 5.9 | 3.7 | 13.7 | 1.5 | 0.3 |

| II - Operating parameters | |
|---|---|
| Feed rate = | 300 kg/h |
| Water injection = | 28 kg/h |
| Air injection = | 500 $Nm^3$/h |
| Net plasma power = | 760 kW |
| Reactor thermal losses = | 665 kW |
| Net power absorbed by process = | 95 kW |
| III - Results | |
| Temperature of fumes at exit of reactor = | 1195° C. |
| Dust content of fumes = | 4.0 g/$Nm^3$ |
| Composition of dust = | Al = 7.3 Si = 5.2 Na = 21.4 F = 48.3 |
| Composition of slag = | Al = 13.5 Si 27.5 Na = 7.2 F = 0.5 |
| | K = 0.6 Ca = 2.0 C = 0.1 |
| IV - Leachability of slag | |
| $CN^-$ not detectable | |
| Soluble F = ≦0.02% by weight | |

EXAMPLE 3

| I - Composition of feed | | |
|---|---|---|
| | Beginning of test | End of test |
| Impregnated blocks | 28.7% | 45.0% |
| Impregnated bricks | 45.3% | 29.3% |
| Sand (Silica $SiO_2$) | 26.0% | 25.7% |

| II - Operating parameters | | |
|---|---|---|
| | Beginning of test | End of test |
| Feed rate | 210 kg/h | 210 kg/h |
| Water injection | 12 l/h | 12 l/h |
| Air injection | 500 $Nm^3$/h | 500 $Nm^3$/h |
| Net plasma power | 1020 kW | 869 kW |
| Reactor thermal losses | 661 kW | 718 kW |
| Net power for process | 359 kW | 151 kW |
| Fumes temperature | 1350° C. | 1350° C. |

| III - Composition of slag (% by weight) | | | | | | | |
|---|---|---|---|---|---|---|---|
| | C | F | Al | Si | Na | Ca | K | Fe |
| Beginning of test | 0.52 | 0.89 | 10.7 | 29.1 | 6.1 | 1.6 | 0.5 | 1.2 |
| End of test | 0.05 | 0.82 | 8.6 | 31.9 | 6.5 | 1.4 | 0.5 | 0.8 |

| IV - Leachability of slag | |
|---|---|
| In all cases | $CN^-$ not detectable |
| | Soluble $F^-$ = ≦0.02% by weight |

What is claimed is:

1. A process for converting environmentally harmful substances into gas or leach-stable compounds, comprising
   i) providing at least one environmentally harmful substance containing at least one member selected from the group consisting of fluorides, sodium and cyanides, and which is in finely divided particulate form;
   ii) pre-eating said environmentally harmful substance in a pre-reaction chamber, thereby producing a pre-heated harmful substance;
   iii) providing a fuel in a furnace and combusting said fuel therein to maintain a furnace temperature which permits reaction of said pre-heated harmful substance with at least one reactant;
   iv) reacting said preheated harmful substance with at least one reactant, thereby converting said pre-heated harmful substance into a gas or a leach-stable compound.

2. The process of claim 1, wherein said reactant is at least one member selected from the group consisting of silica, water and oxygen.

3. The process of claim 1, wherein said pre-reaction chamber is located adjacent and tangentially connected to said furnace.

4. The process of claim 1, wherein said furnace is cylindrical.

5. The process of claim 4, wherein said furnace is a cyclone type having an axial feed.

6. The process of claim 1, wherein said reactant is preheated with said environmentally harmful substance in a prereaction chamber.

7. The process of claim 1, wherein said environmentally harmful substance comprises spent linings from at least one electrolysis cell.

* * * * *